(12) United States Patent
Lloyd et al.

(10) Patent No.: US 11,750,709 B2
(45) Date of Patent: *Sep. 5, 2023

(54) SECURE IN-BAND SERVICE DETECTION

(71) Applicant: CITRIX SYSTEMS, INC., Fort Lauderdale, FL (US)

(72) Inventors: David Alessandro Penry Lloyd, Cambridge (GB); Christopher Morgan Mayers, Histon (GB)

(*) Notice: Subject to any disclaimer, the term of this patent is extended or adjusted under 35 U.S.C. 154(b) by 167 days.

This patent is subject to a terminal disclaimer.

(21) Appl. No.: 17/245,857

(22) Filed: Apr. 30, 2021

(65) Prior Publication Data

US 2021/0329078 A1 Oct. 21, 2021

Related U.S. Application Data

(63) Continuation of application No. 14/695,980, filed on Apr. 24, 2015, now Pat. No. 11,032,379.

(51) Int. Cl.
*H04L 29/00* (2006.01)
*H04L 67/51* (2022.01)
(Continued)

(52) U.S. Cl.
CPC .......... *H04L 67/51* (2022.05); *H04L 63/0281* (2013.01); *H04L 63/0823* (2013.01);
(Continued)

(58) Field of Classification Search
CPC ......... H04L 67/51; H04L 67/01; H04L 67/63; H04L 63/0281; H04L 63/0823; H04L 65/1069; H04L 63/0428; H04L 63/166
(Continued)

(56) References Cited

U.S. PATENT DOCUMENTS 5,185,786 A * 2/1993 Zwick ............... H04M 3/36
379/207.03
7,430,755 B1 * 9/2008 Hughes ............... H04L 9/3263
726/4
(Continued)

FOREIGN PATENT DOCUMENTS

CN 101026456 A 8/2007
CN 101257387 A 9/2008
(Continued)

OTHER PUBLICATIONS

International Search Report and Written Opinion for PCT Application No. PCT/US2015/029315 dated Jul. 9, 2015.
(Continued)

*Primary Examiner* — Jude Jean Gilles

(57) ABSTRACT

Approaches described herein allow an appliance to receive a message from a client device when the client device is attempting to connect to a service other than the appliance. For instance, a client device might connect to a service on a private network, however if the client device is not on the private network, it may encounter an appliance such as a gateway. The appliance is configured to return a message to a client device indicating that it is an appliance, and the client device returns a certificate to the appliance that allows the client to indicate a first purpose of a connection and a second purpose of the connection. In approaches described herein, the second purpose is used by the appliance to perform an action related to providing the service with a certificate that allows for the first purpose, which can include information to create a secure connection between the service and the client device.

20 Claims, 7 Drawing Sheets

(51) Int. Cl.
   *H04L 9/40*   (2022.01)
   *H04L 67/01*   (2022.01)
   *H04L 67/63*   (2022.01)
   *H04L 65/1069*  (2022.01)

(52) U.S. Cl.
   CPC .......... *H04L 63/10* (2013.01); *H04L 65/1069* (2013.01); *H04L 67/01* (2022.05); *H04L 67/63* (2022.05); *H04L 63/0428* (2013.01); *H04L 63/166* (2013.01)

(58) Field of Classification Search
   USPC .......................................................... 709/203
   See application file for complete search history.

(56) References Cited

U.S. PATENT DOCUMENTS

| | | | |
|---|---|---|---|
| 8,095,787 B2* | 1/2012 | Kanekar | H04L 63/166 |
| | | | 726/4 |
| 8,230,214 B2 | 7/2012 | Kanekar et al. | |
| 8,549,157 B2 | 10/2013 | Schnellbaecher | |
| 8,584,214 B2 | 11/2013 | Upp et al. | |
| 8,769,291 B2 | 7/2014 | Schneider et al. | |
| 10,574,703 B1* | 2/2020 | Tribble | H04L 63/12 |
| 10,581,948 B2* | 3/2020 | Goel | H04L 67/55 |
| 11,032,379 B2* | 6/2021 | Lloyd | H04L 63/0823 |
| 2007/0064703 A1 | 3/2007 | Hernandez et al. | |
| 2007/0127440 A1* | 6/2007 | Narayanaswami | H04L 67/02 |
| | | | 370/352 |
| 2009/0254745 A1* | 10/2009 | Ganesan | H04L 9/3234 |
| | | | 713/151 |
| 2010/0083070 A1* | 4/2010 | Xiang | H03M 13/2909 |
| | | | 714/752 |
| 2011/0126003 A1 | 5/2011 | Engert | |
| 2011/0231649 A1* | 9/2011 | Bollay | H04L 63/0245 |
| | | | 713/153 |
| 2012/0271955 A1* | 10/2012 | Deverick | H04L 67/104 |
| | | | 709/227 |
| 2013/0035105 A1* | 2/2013 | Yu | H04L 65/756 |
| | | | 455/450 |
| 2014/0095865 A1 | 4/2014 | Yerra et al. | |
| 2015/0003433 A1* | 1/2015 | Sinha | H04L 63/18 |
| | | | 370/338 |
| 2019/0116173 A1* | 4/2019 | Robison | H04W 12/06 |
| 2019/0327220 A1* | 10/2019 | Huber | H04L 63/18 |

FOREIGN PATENT DOCUMENTS

| | | |
|---|---|---|
| CN | 102346669 A | 2/2012 |
| CN | 103155513 A | 6/2013 |

OTHER PUBLICATIONS

Carpenter, B. et al.; "Middleboxes: Taxonomy and Issues"; Network Working Group Request for Comments 3234; Feb. 2002.

Dierks, T. et al.; "The Transport Layer Security (TLS) Protocol, Version 1.2"; Network Working Group Request for Comments 5246; Aug. 2008.

Cooper, D. et al.; "Internet X.509 Public Key Infrastructure Certificate and Certificate Revocation List (CRL) Profile" Network Working Group Request for Comments 5280; May 2008.

* cited by examiner

SECURE IN-BAND SERVICE DETECTION

CROSS-REFERENCE TO RELATED APPLICATIONS

The present application is a continuation of U.S. patent application Ser. No. 14/695,980, filed on Apr. 24, 2015. The content of this application is incorporated herein by reference in its entirety.

BACKGROUND

There are many instances where electronic client devices need to securely connect to a remote service. For instance, many companies allow their employees to access various secure services either from within an office or from home.

In the office example, a user may be able to access intranet services from a computer at work. Often, when a client device is attempting to reach a service such as an intranet on a private network (e.g., from work), the client device must usually authenticate the service and vice-versa. For example, the client device may need to authenticate a device running a service using a transport layer security (TLS) protocol to ensure that it is securely communicating with the correct device. In the office example, the user may be able to access the services without having to pass through or authenticate itself via a gateway and/or firewall.

When the employee wishes to connect to a workplace intranet from their home laptop, however, complications can occur as the client device inadvertently reaches a gateway and/or firewall instead of the intended service. For example, a client device might first need to determine whether it is connecting to the machine that is hosting the secure service, or if it is accessing a gateway and then being redirected to the machine hosting the secure service. In addition, the client device may need to determine whether the remote service is running the correct type of service. Moreover, a client device can have a security policy allowing only certain types of connections, which can prevent the client device from reaching the service due to a gateway. In some cases, the communication initiation process might need to be restarted at the client device.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

Embodiments described herein provide in-band service detection using a secure protocol. These embodiments allow a client device to securely communicate with a service. For example, according to at least some of the described embodiments, a client device requiring a service from a remote server can be configured to have a policy that allows the client device to examine a certificate of the server it connects to. Based on the examination, the client device can alter its behavior or security model in a manner to complete the connection between the client device and the remote server. Herein, the term service can include, but is not limited to: a service running on a machine, device, or multi-tenant environment (e.g., a cloud or hybrid cloud), a machine or device itself, a server, a service provider, a domain name server, an application, a program, a device that provides data to a client device, etc.

In various embodiments, the same data sent to a service for initiating a communication (e.g., data used for completing a TLS handshake, also referred to as initiation data, a hello message, or a handshake message) can reach a gateway device, and nevertheless be passed on and reach a service without requiring the client device to resend initiation data to the gateway, thus saving time, bandwidth, and other resources (particularly when many client devices are communicating with various services).

Also, in some embodiments described herein, a client device may attempt to reach a service located in a prohibited area, or send data through a prohibited area. In some cases, a client device might reach a gateway capable of determining that the client device might send data to, or through, a prohibited location. In such a case, the gateway may block or redirect data such that the data does not enter the prohibited area.

Figure 1:
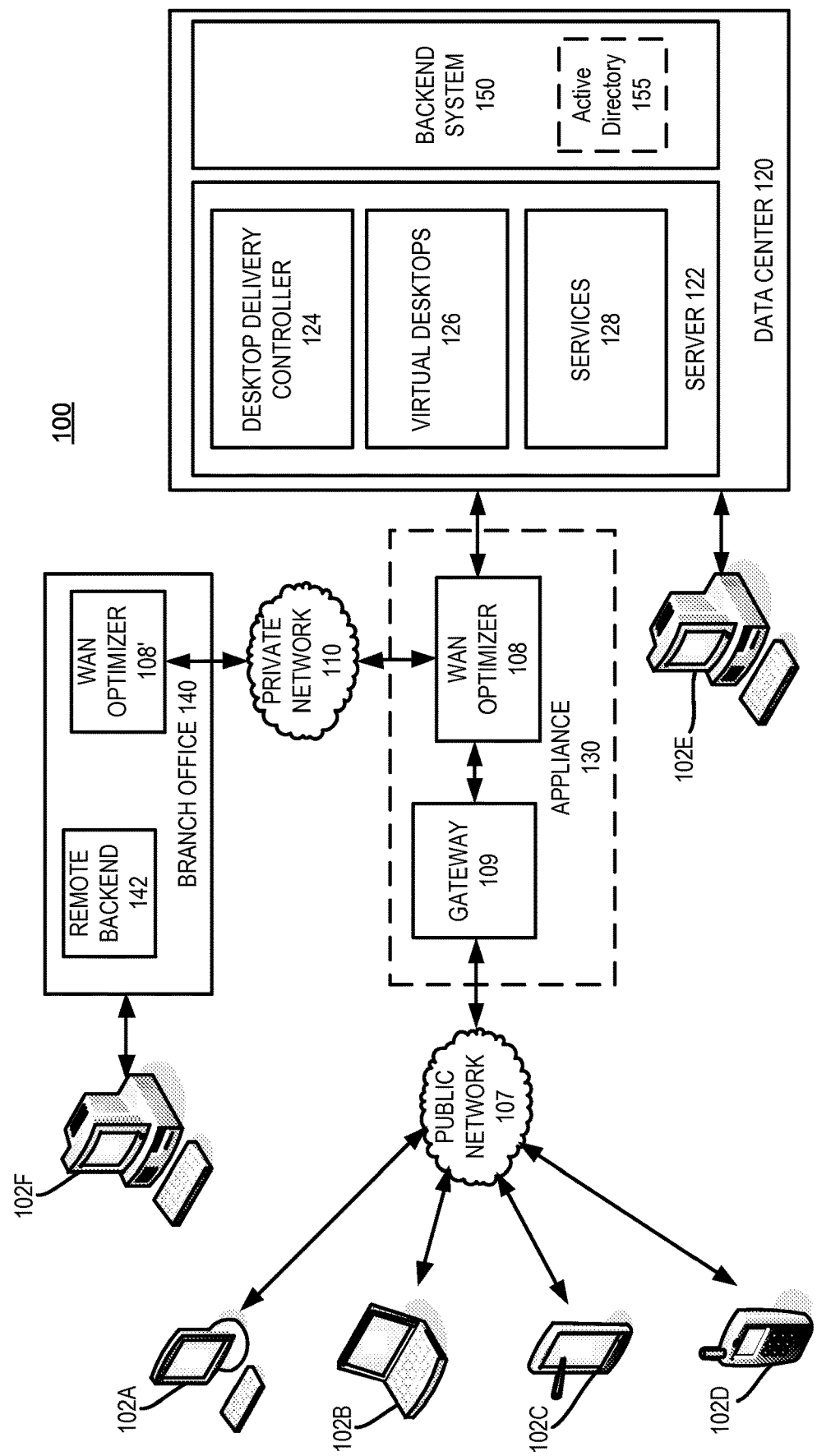
FIG. 1 is a block diagram of an exemplary network environment, consistent with embodiments of the present disclosure.

FIG. 1 is a block diagram of exemplary network environment 100, consistent with embodiments of the present disclosure. While exemplary network environment 100 is directed to a virtual network environment, it is appreciated that network environment 100 can generally be any type of network that communicates using packets. Network environment 100 can include one or more client devices 102, public network 107, appliance 130 (which can include a variety of middlebox functionality such as a wide area network (WAN) optimizer 108 and/or gateway 109), private network 110, data center 120, and branch office 140.

In various embodiments, one or more client devices 102 are devices that can acquire remote services from data center 120 through various means. Client devices 102 can communicate with data center 120 either directly (e.g., client device 102E) or indirectly through public network 107 (e.g., client devices 102A-D) or private network 110 (e.g., client device 102F). While client devices 102 are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device that can send and receive signals to and from data center 120, such as a wearable computer.

As discussed above, appliance 130 can perform a variety of functions. In some embodiments, appliance 130 can be a Citrix™ NetScaler box. Appliance 130 can be a device acting as a gateway, or at least include functionalities of a gateway. In some embodiments, appliance 130 can be included within data center 120. In various embodiments, appliance 130 can include WAN optimizer 108, which can perform a variety of functions including, but not limited to: load balancing, determining security protocols, authenticating devices, storing authentication information such as certificates, support the creation of virtual machine instances, other functions that data center 120 can perform, etc.

Gateway 109 can be a standalone device, or be included in appliance 130. In various embodiments, gateway 109 can be a physical device or software that is part of a physical device (such as appliance 130, data center 120, etc.) that interfaces between public network 107 and WAN optimizer 108 that can perform various functions as described above (e.g., load balancing, policing traffic, performing at least portions of security protocols, etc.). Gateway 109, for example, can be a server, a router, a host, or a proxy server. In some embodiments, gateway 109 can include or be coupled to a firewall separating gateway 109 from public network 107 (e.g., Internet). Gateway 109 has the ability to modify signals received from client device 102 into signals that WAN optimizer 108 and/or data center 120 can understand and vice versa.

WAN optimizer 108 can also be a standalone device, or included in an appliance 130. In some embodiments, WAN optimizer 108 can be virtual. Appliances can be located at a variety of locations. For example, WAN optimizer 108 can be located between a server/data center and a gateway (e.g., gateway 109), at a location connected to a device via a private network (e.g., WAN optimizer 108'), and/or in a public network, cloud (hybrid or otherwise), or other multi-tenant environment. In some embodiments, the functionality of gateway 109 and WAN optimizer 108 can be located in a single appliance. In any case, one or more WAN optimizers can work alone or in conjunction with one or more other WAN optimizers, gateways, or appliances.

Moreover, while FIG. 1 shows appliance 130 having a WAN optimizer 108, it is appreciated that appliance 130 may not have a WAN optimizer or WAN optimizing functionality. Moreover, it is appreciated that WAN optimizer 108 can be replaced with a load balancer or some other type of appropriate middlebox (e.g., such as the middleboxes referred to in RFC 3234).

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and backend system 150. In some embodiments data center 120 can include gateway 109, WAN optimizer 108, or a combination of both.

Server 122 is an entity that can be represented by any electronic addressable format, and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications (e.g., services 128) to one or more endpoints (e.g., client devices 102A-F or branch office 140). For example, applications 128 can include Windows™-based applications and computing resources.

In some embodiments, the services include providing one or more virtual desktops 126 that can provide one or more services 128. Virtual desktops 126 can include hosted shared desktops allowing multiple users to access a single shared Remote Desktop Services desktop, virtual desktop infrastructure desktops allowing each user to have their own virtual machine, streaming disk images, a local virtual machine, individual applications (e.g., providing one or more services 128), or a combination thereof.

Backend system 150 is a single or multiple instances of computer networking hardware, appliances, or servers in a server farm or a bank of servers and interfaces directly or indirectly with server 122. For example, in some cases backend system 150 can include Microsoft Active Directory 155, which can provide a number of network services, including lightweight directory access protocol (LDAP) directory services, Kerberos-based authentication, domain name system (DNS) based naming and other network information, and synchronization of directory updates amongst several servers. Backend system 150 can also include, among other things, an Oracle backend server, a SQL Server backend, and/or a dynamic host configuration protocol (DHCP). Backend system 150 can provide data, services, or a combination of both to data center 120, which can then provide that information via varying forms to client devices 102 or branch office 140.

Branch office 140 is part of a local area network that is part of the WAN having data center 120. Branch office 140 can include, among other things, WAN optimizer 108' and remote backend 142. Branch office 140 can communicate to appliance 130, or in some embodiments can include an appliance. In some embodiments, WAN optimizer 108' can sit between branch office 140 and private network 110. As stated above, WAN optimizer 108' can work with WAN optimizer 108, etc. Remote backend 142 can be set up in similar manner as backend system 150 of data center 120. Client device 102F can be located on-site to branch office 140 or can be located remotely from branch office 140.

WAN optimizers 108 and 108' can be deployed as is, or executed on any type and form of computing device. Including any computer or networking device capable of communicating on any type and form of network described herein.

Figure 2A:
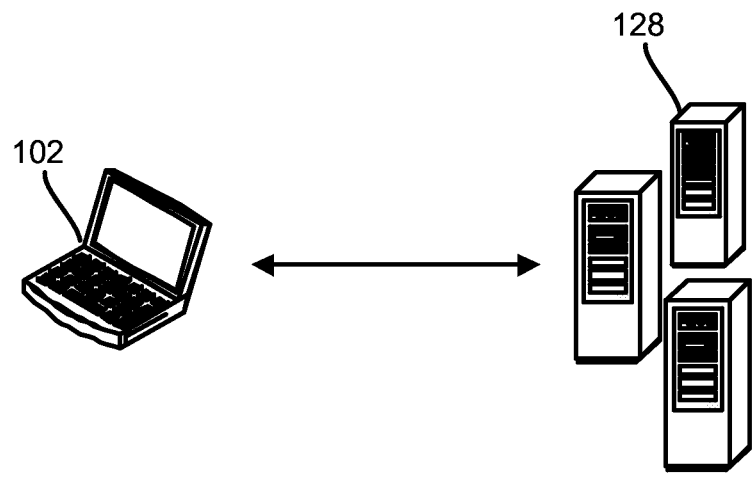
FIGS. 2A-2B are diagrams of exemplary client devices and services, consistent with embodiments of the present disclosure.

FIG. 2A illustrates an environment 200 comprising exemplary client device 102 and service 128, consistent with embodiments of the present disclosure. As described above service 128 can comprise a program, application, intranet, or other software that can be executed on one or more electronic devices including, but not limited to: servers, the cloud, clusters of servers, etc. Connections between the electronic devices, including between client device 102 and service 128, can be made at least in part using a TLS protocol.

In accordance with various embodiments described herein, environment 200 illustrates the situation in which a user is connected to a private network (e.g., client device 102E connecting to data center 120 or client device 102F connecting to data center 120 via private network 110, both of which are illustrated in FIG. 1). For example, a user can be physically located at their place of business, and access their corporate network using a uniform resource locator (URL) such as mydesktop.citrix.com. If the user went home and tried to connect to the private network (or a hybrid cloud environment, for instance), they might end up at a corporate firewall. For example, when attempting to access the URL mydesktop.citrix.com, a client device might access a website associated with the URL, such as citrix.com. Embodiments described herein address such a situation, where a client device can connect to a secure service, but does not connect to service 128 without first passing through some type of gateway and/or firewall. In embodiments described herein, by using in-band information provided by a TLS handshake, data can travel over the untrusted Internet, authenticate at the appliance, and securely connect to an intended service.

Figure 2B:
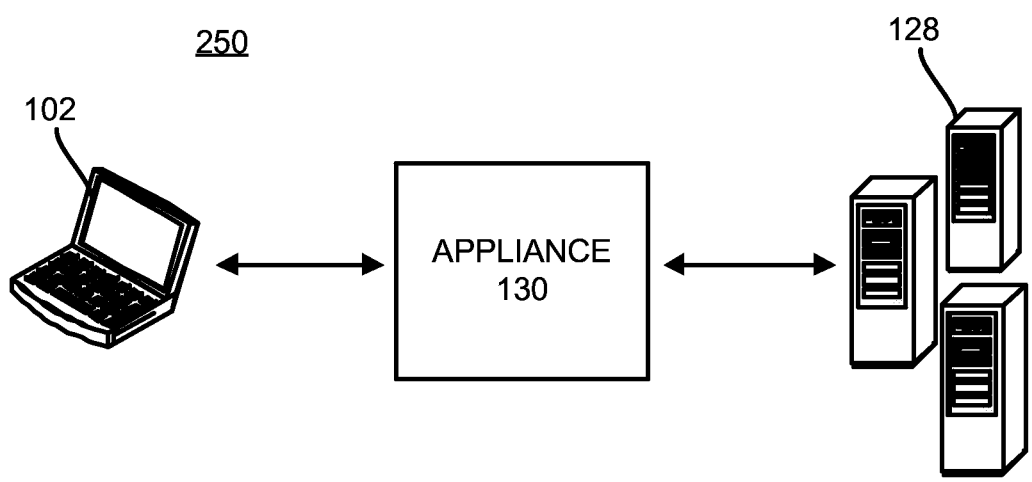

FIG. 2B illustrates environment 250 comprising exemplary client device 102, service 128, and appliance 130 (e.g., where client devices 102A-D attempt to connect to data center 120 via gateway 109 of appliance 130, as illustrated in FIG. 1). Appliance 130 can be a device in a computer network (e.g., an application delivery controller), and can perform common tasks such as those done by websites to remove loads from web servers. Appliances can perform many tasks including load balancing, authentication, etc. Appliances can be part of an application delivery network, and are sometimes placed in a perimeter network (also referred to as a demilitarized zone) between a firewall or router and a service 128. In embodiments described herein, appliances 130 can include, or be referred to, as gateways, front-end intelligence providers, etc. Further, in some embodiments, appliance 130 can be a NetScaler Box or NetScaler Gateway.

In various embodiments, appliance 130 can receive information from a client device 102 trying to reach a service 128, even though appliance 130 is not service 128, nor is appliance 130 trusted by client device 102. In various embodiments described herein, a certificate sent from client device 102 (that can be used to authenticate client device 102 using TLS) can be annotated with a specific tag. This tag, in various embodiments, allows appliance 130 to determine that the client device can be trusted, and can be used by appliance 130 to determine where to send data that it received from client device 102. Data sent from appliance 130 to service 128 is also encrypted using TLS, based at least in part on information included in the certificate that appliance 130 received from client device 102. Thus, service 128 can be reached by client device 102 regardless of whether data is being sent directly from client device 102 or through appliance 130.

In various embodiments, client device 102 determines where to send data received based at least in part on a response hello message from the appliance 130 that can include information in its own certificate. In various embodiments, connections made by client devices 102 can include a "first purpose," a "second purpose," and/or additional "purposes." Note that the terms first, second, and the like can be used interchangeably with the terms primary, secondary, and the like. Further, the term purpose can have different connotations, including, but not limited to: function, portion, intention, objective, goal, target, part, end, usage, use, etc. Regardless of how this type of data is referred to, this data can provide information related to TLS (e.g., a key), a destination, a type of data in an associated payload, etc. In various embodiments, certificates provided by one or more devices can be used to determine whether they satisfy one or more purposes. Thus, it could be said that certificates authorize purposes by indicating that the device the certificate belongs to is a firewall, a gateway, a service, etc. For example, a client device 102 could examine an appliance's 130 certificate to determine that a second purpose is satisfied (e.g., authenticating the appliance 130).

To illustrate an example situation, in some embodiments, data sent by client device 102 to service 128 is delivered to appliance 130 and includes a certificate that accomplishes two purposes. Client device 102 can have a primary purpose for a network connection (e.g., to connect to mydesktop.citrix.com securely), a secondary purpose (e.g., communicate through the corporate firewall), and in some examples a third purpose (e.g., interact with auditing systems). Certificates can be examined to determine whether they satisfy one or more purposes. Thus, it can be said that certificates authorize purposes, for example, by asserting information indicating that the device providing the certificate is a firewall, a gateway, etc. Note that the data can be sent to appliance 130 because, for instance, client device 102 is sending data from an employee's home network. Although client device 102 may not initially trust appliance 130 for the primary purpose of the connection, client device 102 can determine whether to send its encrypted information to appliance 130 based on a process called certificate pinning, where a client device has a list of appliances. A list of appliances can be provided to a client from a private network (e.g., while client device 102 is connected to a company's network), manually (e.g., through a USB storage device, disk, or other non-networked device), from a browser, or another trusted source. If appliance 130 is identified in the list of appliances, client device 102 can trust appliance 130 and send the encrypted information to appliance 130. As such, in various embodiments, although appliance 130 might not initially be trusted, client device 102 can determine that it is meant to communicate with appliance 130 because the list of appliances indicates that appliance 130 is a particular appliance.

After data is received by appliance 130, information associated with a secondary purpose of a connection can be used by appliance 130 to determine where to send the received data. For instance, appliance 130 can include information (e.g., in a table or other data structure) that uses secondary purpose information to determine where (or where not) to send the data. From there, appliance 130 is able to send information to service 128 that includes the certificate sent by client device 102 and the first purpose information. The first purpose can then be used by service 128 to authenticate client device 102 using TLS, and ensure that it is communicating with an appropriate device. Thus, the process of sending data from client device 102, over TLS to appliance 130, and then over TLS to service 128, would be referred to as tunneling TLS over TLS—since there are multiple handshakes occurring which use TLS, as described in Request For Comments (RFC) 5246.

With reference to the situation discussed above, a primary purpose can be used to connect client device 102 to mydesktop.citrix.com, and if appliance 130 is encountered, a secondary purpose can be used by appliance 130 to determine whether data can flow through appliance 130 and/or the route for sending the data.

Again, it should be appreciated that a client can have more than two purposes for a network connection, and a certificate can be examined to see if the purposes are satisfied. For example, a client can have a purpose that connects to a service (e.g., mydesktop.citrix.com, WanScaler, etc.), gets through firewall security, interoperates with auditing systems, other types of security, etc., such that the data and the primary purpose reach service 128.

In various embodiments, the number of purposes can be defined by an administrator or client device. Further, an administrator can have the ability to install appropriate digital certificates on various services. In some embodiments, no user interaction can be performed with regard to making security decisions (either at client device 102, service 128, and/or appliance 130).

In various embodiments, it is assumed that client devices, services, and other devices described herein are using standard Public-Key Infrastructure X.509 (PKIX), as described in RFC 5280, and that additional mechanisms for using two or more validated certificate chains in combination for a single purpose can be implemented. Typically, only one set of inputs is provided to a PKIX algorithm, corresponding to a secure connection policy. In embodiments described herein, that one set of inputs is referred to as a first purpose, or a primary purpose, of a connection. In various embodiments described herein, a second purpose (or more) is allowed if a primary purpose failed PKIX certificate validation, but one of the alternative sets of PKIX inputs corresponding to the second purpose would validate correctly (e.g., at appliance 130). A client device application (or simply "application") making the connection could be aware of the purposes. Thus, the application might not need to realize that data it sent was not received by a service 128 and have to retry sending the data. Instead, if a primary purpose was not accepted, a secondary purpose can be used as a PKIX input to allow the data to pass through appliance 130 and arrive at service 128, where a primary purpose PKIX input can be used for authentication.

In some embodiments, different applications can choose different ways of configuring first purpose secure connection policies and second purpose secure connection policies. Some options can include, but are not limited to: certificate pinning, common name matching, certificate usage purposes, issuance policies, and trust anchors. Certificate pinning refers to a protocol where certificates that are expected to be received are specified. Common name matching refers to a protocol where an X500 subject name on a certificate is specified. Certificate usage purposes refers to a protocol in which specific Extended Key Usage Object Identifiers (EKU OIDs) appear on a certificate. Issuance policies refers to a protocol that specifies what verification was performed when one or more certificates were issued. Lastly, trust anchors refer to a protocol in which a Certificate Authority that issued a certificate is specified.

In some embodiments, applications making connections might not be associated with anything other than a primary purpose. For example, integrating a legacy product that does not recognize a secondary purpose can be problematic. In embodiments described herein, however, service 128 can provide data to appliance 130 to be added to a certificate as a secondary purpose that can include a Gateway Proxy Enhanced Usage certificate extension. Such a secondary purpose can be valid even though a DNS name is not a service that the application of client device 102 was attempting to connect to. Such a connection can be allowed to proceed through appliance 130, but only for the security context of the secondary purpose, which in this example is authentication to appliance 130, which can be trusted. Such security can guarantee that the secondary purpose is not suitable for making a primary purpose connection (e.g., connecting to service 128 itself), but that client device 102 security policy can determine that it can use appliance 130 to make a hyper-text transfer protocol (HTTP) connection for a TLS-over-TLS connection that can satisfy a primary purpose. Thus, without any additional protocol modifications, a laptop attempting to connect to mydesktop.citrix-.com can automatically detect and use an appropriate security model through appliance 130 when it is outside a corporate firewall.

In some embodiments described herein, certificate validation responsibilities can be shared. As an example, in a case where client device 102 can communicate to a server containing data (e.g., medical data) while client device 102 is at a particular location (or connected to a particular network), client device 102 can determine how it can authenticate service 128 with a certificate. In some embodiments, however, client device 102 might not contain information regarding other security policies. For example, it might not be able to communicate with a service because it is in the medical department. In such a case, client device 102 can communicate with appliance 130 such that appliance 130 recognizes that client device 102 is in a different location (or on a different network), and appliance 130 can allow client device 102 to communicate with service 128 (which can be in a different department, location, and/or on a different network), even though client device 102 (and possibly service 128) are not aware (e.g., do not contain information indicating) that they cannot communicate with each other given various security protocols. As such, client device 102 can indicate that there is information it does not have, and when it communicates with appliance 130, it can trust appliance 130 to make decisions on behalf of client device 102.

In various embodiments, infrastructure servers can be used to assist client devices and services in applying overarching security policies to certificate validation. In such a scenario, a TLS communication routing security decisions can be made in conjunction with a secondary infrastructure overlay gateway system. A primary purpose security would always be guaranteed in such a case, but other systems could collaborate to impose additional restrictions, auditing, and/or other security policies. Note that while typical TLS connections are computer to computer, this can become unmanageable when there is a large number of servers and laptops that can change locations. Embodiments described herein envisage a higher level structure (e.g., "computers in the USA," "Computers in France," etc.) that substantially mirror the experience of maintaining a laptop "on the Intranet" and "at home" in a cloud/virtualized environment (e.g., not on a corporate environment without a firewall/gateway). This is performed by overlaying gateways, and forcing clients to determine whether a particular purpose is met (e.g., in step 440 of FIG. 4).

For example, in a hybrid cloud environment a client device can access a remote system for storing confidential data such as medical records. Such an embodiment can be configured such that when both client device 102 and service 128 reside within an enclave (e.g., the same network without a need for appliance 130) they can communicate freely. If one service were to be outsourced, a connection could arrive at appliance 130 hosting a trusted secondary purpose "externalized certificate validation" system.

In one example, a service can be an auditing server, such that when client device 102 attempts to make a connection, appliance 130 could contain a secondary purpose for the auditing server, and the client device could authenticate to the auditing server and use it as an audit system. In such a case, appliance 130 does not need to contain information indicating what types of communication are occurring, and a secondary purpose can be sent back to client device 102 such that service 128 can verify that a connection is secure.

Figure 3:
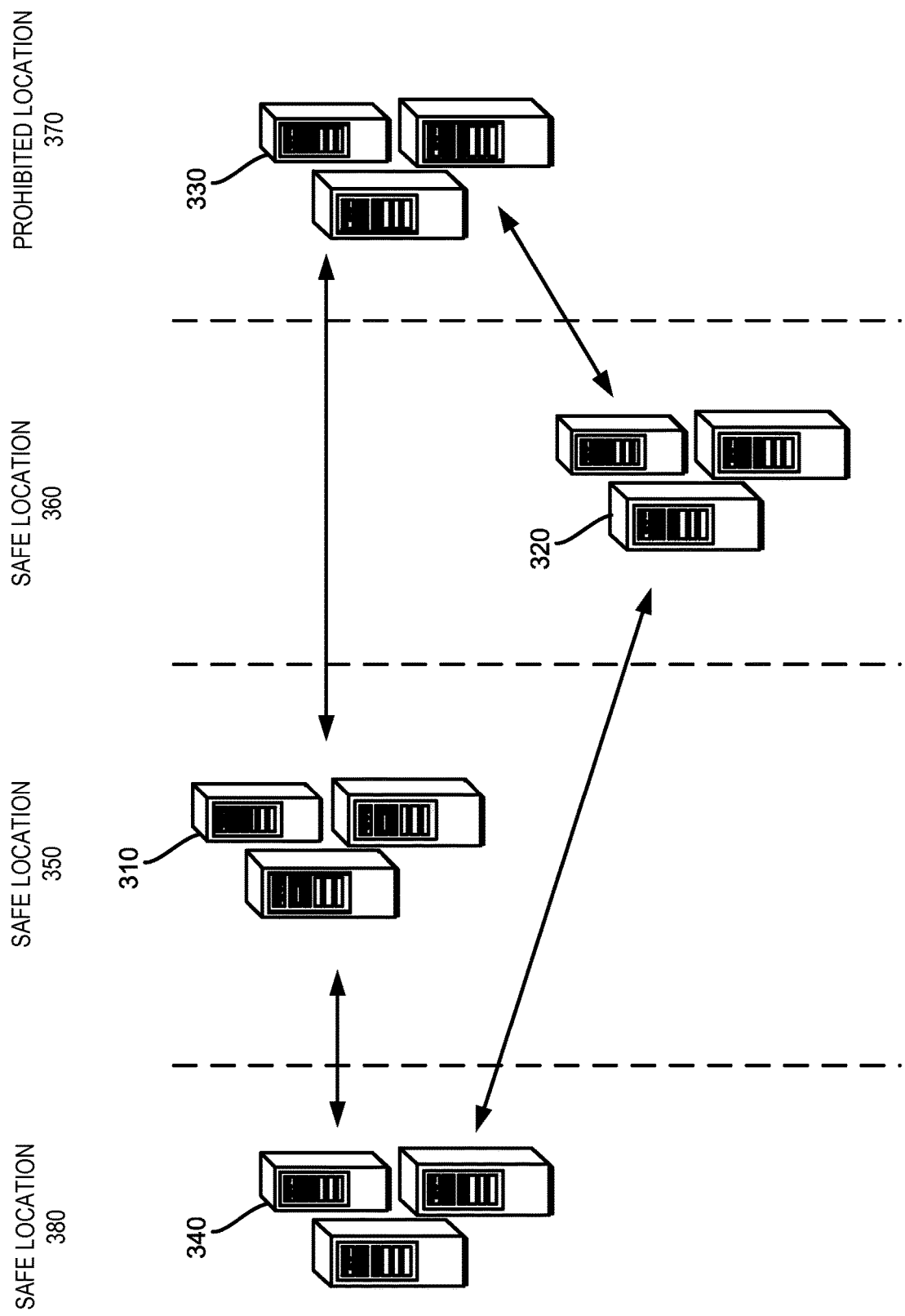
FIG. 3 is a diagram of exemplary routes by which data may travel, consistent with embodiments of the present disclosure.

In some embodiments, appliance 130 is capable of determining that client device 102 might send data to, or through, a prohibited location. In such a case, appliance 130 may redirect data or inform the client that transfer is not permitted, such that the data does not enter the prohibited area. For example, FIG. 3 illustrates an environment 300 comprising exemplary routes by which data can travel. Environment 300 comprises services in four locations, although there could be additional or fewer locations. Further, these locations can be physical or virtual. For instance, a location could be a country, or it could be a network. Environment 300 comprises safe locations 350, 360, and 380, as well as prohibited location 370. Safe locations can also be referred to as non-prohibited locations, allowable locations, accepted locations, etc. Each safe location can comprise one or more services 310, 320, 330, and 340.

In various embodiments described herein, data can be prohibited from entering or exiting one or more locations. For example, data associated with medical or legal documents can be prohibited from entering prohibited location 370 due to corporate policies, international laws, etc. In any case, in some embodiments, data might need to travel from one point to another—for example, from safe location 350 to safe location 360. In some embodiments, an appliance located in safe location 350 can determine, based at least in part on a certificate provided by a client device, that data intended to be sent to a service in safe location 360 cannot pass through prohibited location 370 (as well as performing actions associated with a secondary purpose, as discussed above). Thus, instead of sending the data to a service in safe location 360 via a machine in prohibited location 370, an appliance in safe location 350 can determine that it will instead send data to safe location 360 via a machine in safe location 380, such that the data never enters prohibited location 370.

As discussed above, a purpose of a connection can be used to determine whether an appliance can send data to or through a particular location. For example, the certificate can have information (e.g., one or more assertions authorizing purposes) associated with a connection's primary purpose (which is to provide information to a service), and with a secondary purpose (which could be to indicate the type of data included in a payload). A payload can be any type of data provided to an appliance or service. For example, a payload (e.g., a type of data), can include, but is not limited to: data associated with medical records, data associated with legal documents, financial information, banking information, source code, product specifications, data associated with privacy information such as policies and protocols, data related to a department of a corporation (e.g., human resources, legal, sales, marketing, cryptography, social presence, etc.), etc.

In some embodiments, appliance 130 can be configured to log a date and/or time associated with connections (e.g., for regulatory compliance, record keeping, etc.). Further, appliance 130 can block hybrid cloud connections where security properties of a remote cloud being accessed are not appropriate for a connection. In some embodiments, this information can be used to alert administrators or other users, and indicate that an infrastructure needs to be moved to a safe location. In some embodiments such an alert can be based on a type of information received at an appliance, or if a particular amount of a type of information is received at an appliance.

Figure 4:
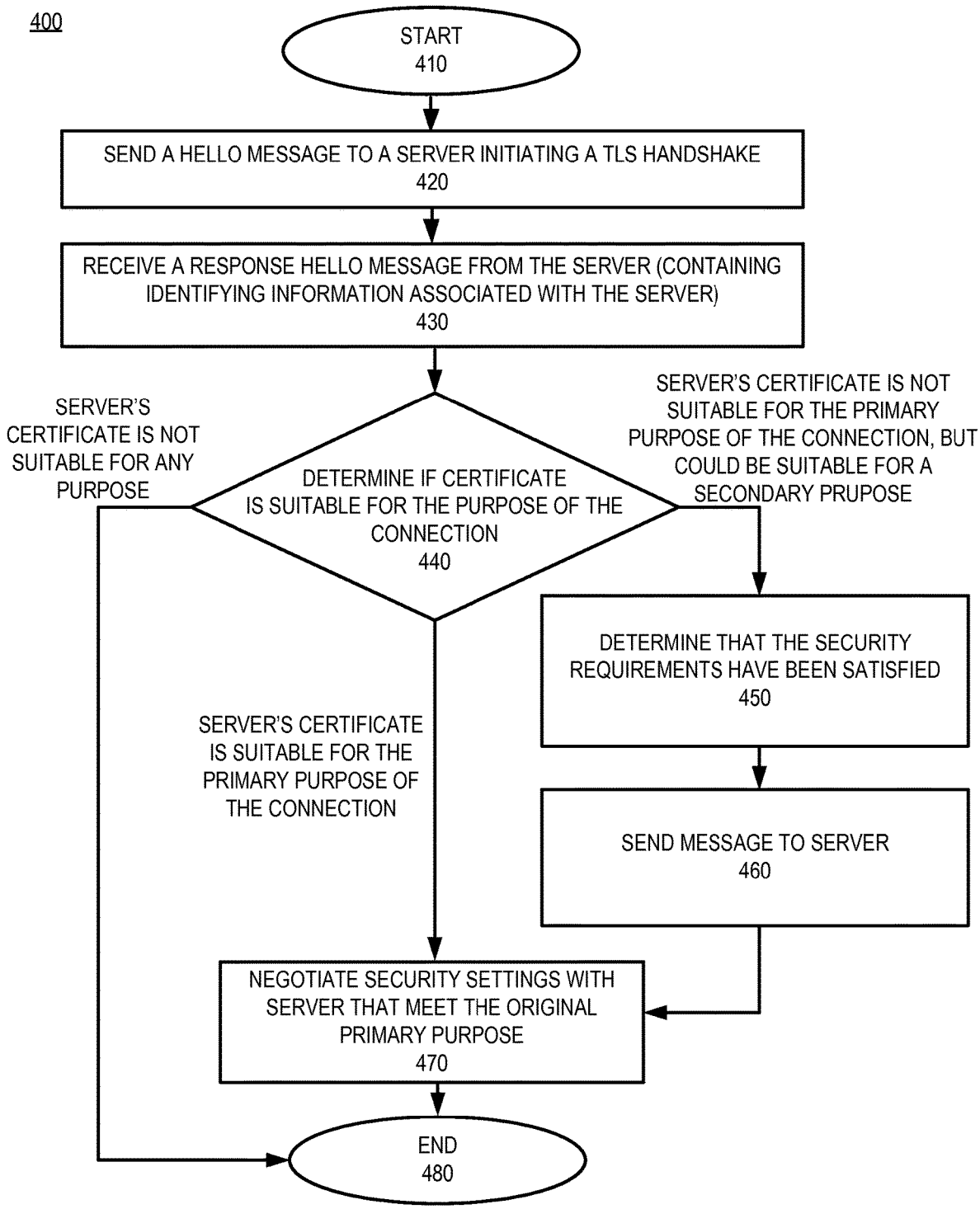
FIG. 4 is a flowchart representing an exemplary method for receiving a request to access a service at an appliance, consistent with embodiments of the present disclosure.

FIG. 4 is a flowchart representing exemplary method 400 for receiving a request to access a service at an appliance, consistent with embodiments of the present disclosure. Referring to FIG. 4, it will readily be appreciated that the illustrated procedure can be altered to delete steps or further include additional steps, as described below. Moreover, steps can be performed in a different order than shown in method 400, and/or in parallel. While the flowchart representing method 400 provides exemplary steps performed by an appliance (e.g., appliance 130), it is appreciated that one or more other devices (e.g., client device 102 and/or service 128) can be involved.

After initial start step 410, at step 420, the appliance (also referred to as a server) receives a handshake message from a client device initiating a TLS handshake. In response to the handshake message, the appliance can send its own handshake message referencing itself (e.g., a message from the appliance that includes information identifying the appliance) to the client device at step 430. This identifying information can include a certificate or other information that can be used to authenticate the appliance, and/or be used to identify the appliance on a list of appliances stored on a client device (e.g., via certificate pending). At step 440, a determination is made as to whether the appliance's certificate is suitable for the purpose of the connection. A first purpose and second purpose can be expressed in a certificate that the appliance transmits to the client. As described above, in various embodiments a first purpose can include information intended to be received by a service. The first purpose can include encrypted data that a client device would normally send to a service when the client device does not know it will encounter an appliance. As described above, the second purpose can include information about the data that the client device attempts to transmit to a service (e.g., type of information such as banking or medical information). The second purpose can also include information about a service, device, or location that the client device attempts to transmit information to. In some embodiments, the second purpose can be expressed as a new Gateway Proxy Enhanced Usage OID certificate extension.

If the appliance's certificate is not suitable for any purpose, the method 400 ends.

If, the appliance's certificate is suitable for the primary purpose of the connection, then the method 400 proceeds to step 470, where security settings are negotiated between the client and a server that meets the primary purpose of the connection (e.g., to access a service). These security settings can be based on the primary purpose of a connection as indicated by a client device. If, however, an appliance's certificate is not suitable for a primary purpose of a connection, but it could be suitable for a secondary purpose, the method 400 can proceed to step 450. At step 450, a determination is made by the client that the security requirements (e.g., for the primary purpose of the connection) have been satisfied. After the security requirements have been satisfied, the method proceeds to step 460 where a message can be sent to a server. For instance, this could be a negotiation, such as providing a user name and password, or information including a message indicating that the service is appropriate for one or more secondary purposes. After a message is sent to a server, the method 400 can continue to step 470, where security settings with a server that meets the original primary purpose can be negotiated, such that, for example, a client can communicate with the service it intended to communicate with before it encountered an appliance. The method 400 can then end at step 480.

It should be appreciated that unless otherwise specified herein, as the transmission or provisioning of data can be used to indicate the direct transfer or availability of data (e.g., a packet or certificate) to another device, or the indirect transfer or availability of data to another device. For instance, if a client device transmitted or provided data to a service, then (1) that client device could have transmitted or provided that data directly to that service, or (2) that client device could have transmitted or provided that data to one or more intervening devices, such that the data is received by the service after being transmitted or provided to the one or more devices.

Figure 5:
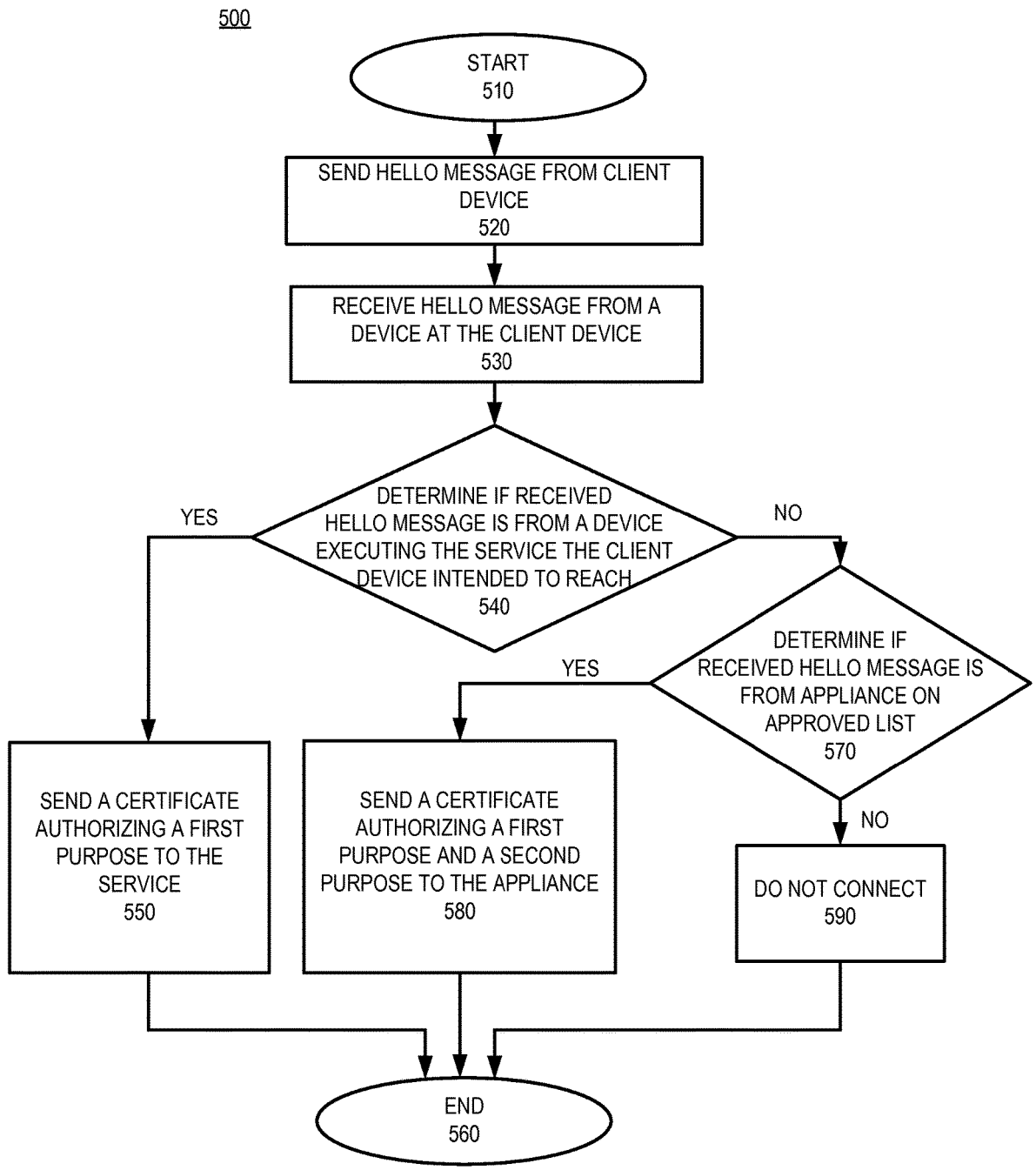
FIG. 5 is a flowchart representing an exemplary method of sending a certificate with one or more authorization purposes, consistent with embodiments of the present disclosure.

FIG. 5 is a flowchart representing an exemplary method 500 for sending a certificate with one or more purposes, consistent with embodiments of the present disclosure. Referring to FIG. 5, it will readily be appreciated that the illustrated procedure can be altered to delete steps or further include additional steps, as described below. Further, steps can be modified, performed in a different order than shown in method 500, and/or in parallel.

After initial start step 510, a client device can send a handshake message to an appliance to initiate a TLS handshake at step 520. At step 530, a corresponding handshake message is received from a device. This handshake message can reference the device (e.g., identify the device). Although this message is referred to as a handshake message, it should be understood that this refers to information sent between two devices in order to complete a TLS handshake, and is sometimes referred to as a hello message. This information could include information indicating that the client device reached (e.g., transmitted/received information from) is a service the client device was expecting to reach or an appliance (e.g., some type of gateway).

At step 540, a determination is made as to whether the handshake message received by the client device was received from the service (e.g., a server executing the service that the client device intended to reach), or if the received handshake message was received from an unexpected device, such as an appliance.

If a determination is made that the handshake message received by the client device was from the service the client device intended to reach, the client device can send a certificate authorizing first purpose to the service at step 550. For example, if a client device connected on a user's work network attempted to reach a service on the work's intranet, and after sending a handshake message in an attempt to connect the service responded (rather than a gateway), then the client device can send a certificate associated with a first purpose. For example, the client device could send a certificate including a first purpose and a second purpose, although it is contemplated that a client device could send a certificate including only a first purpose in some embodiments, as the first purpose is required to communicate with a service. Although not shown in method 500, the sending of the first purpose can be part of the TLS handshake, and then the method can end at step 560.

If a determination is made at step 540 that the handshake message a client device received was not from the service the client intended to reach, then method 500 continues to step 570, where a determination is made as to whether the received handshake message was received from an appliance on an approved list (e.g., the approved list can specify certificate pinning so a client device can determine whether appliance 130 is trusted and/or approved to receive data). If the handshake message received is from a device that is not trusted and/or approved, then at step 590, no connection is made, and method 500 ends at step 560. If a determination is made that the received handshake message is from an appliance that is approved and/or trusted, then a client device can send a certificate associated with a first purpose and a second purpose to the appliance at step 580. As described above, the second purpose can be used to assist the appliance in determining where to send data received from the client device, as one example. Although data may continue to flow through an appliance to a service, for the purposes of example method 500, the method ends at step 560 after a certificate associated with (or including) a first purpose and a second purpose is sent to the appliance.

It should be appreciated that in place of, in addition to, or in combination with the methods, systems, and approaches described above, other embodiments intended to perform similar functions can be implemented. For instance, in some embodiments a manually configured virtual private network system could be used. Virtual private networks can have routing tables that can be configured and/or updated and used to determine the locations of various services. In some embodiments, updating a virtual private network routing table could eliminate the need for an appliance.

Another approach can involve client devices first connecting to a central authentication, and/or redirection system before attempting to connect to a service. In such an example, an application level protocol can be used to determine the location of services. For instance, an application could provide an XML file with the locations of services to client devices. In addition, software defined networks can be configured, allowing a user to manage network services through abstraction of lower-level functionality.

A software defined network could work well if executed on specialized networking hardware, or in a small number of supported virtual machine environments.

The embodiments described herein can be used with HTTP 2.0 (also known as HTTP/2), which is a more recent version of HTTP that modifies how data is framed and transported between a client and a server, and sits alongside other approaches to Service Identification. If a web server connects using a standard unencrypted http:// protocol, HTTP/2 allows the web server to send a message to a client indicating that https:// is available at the server. A browser can, unbeknownst to a user, reconnect to a device using https and encrypt a connection. This can prevent forms of passive surveillance. With the embodiments described herein, the http:// headers allow a plurality of different protocols in addition to HTTPS, and can redirect a web-browser appropriately. It should be appreciated that the embodiments described herein can work with all protocols (e.g., not only HTTPS), as those embodiments operate at the TLS level. In addition, the embodiments described herein do not require a step of redirecting a connection to another location. Further, the embodiments described herein can be based on location and/or content-types, whereas HTTP protocols are intended to upgrade security wherever possible.

Figure 6A:
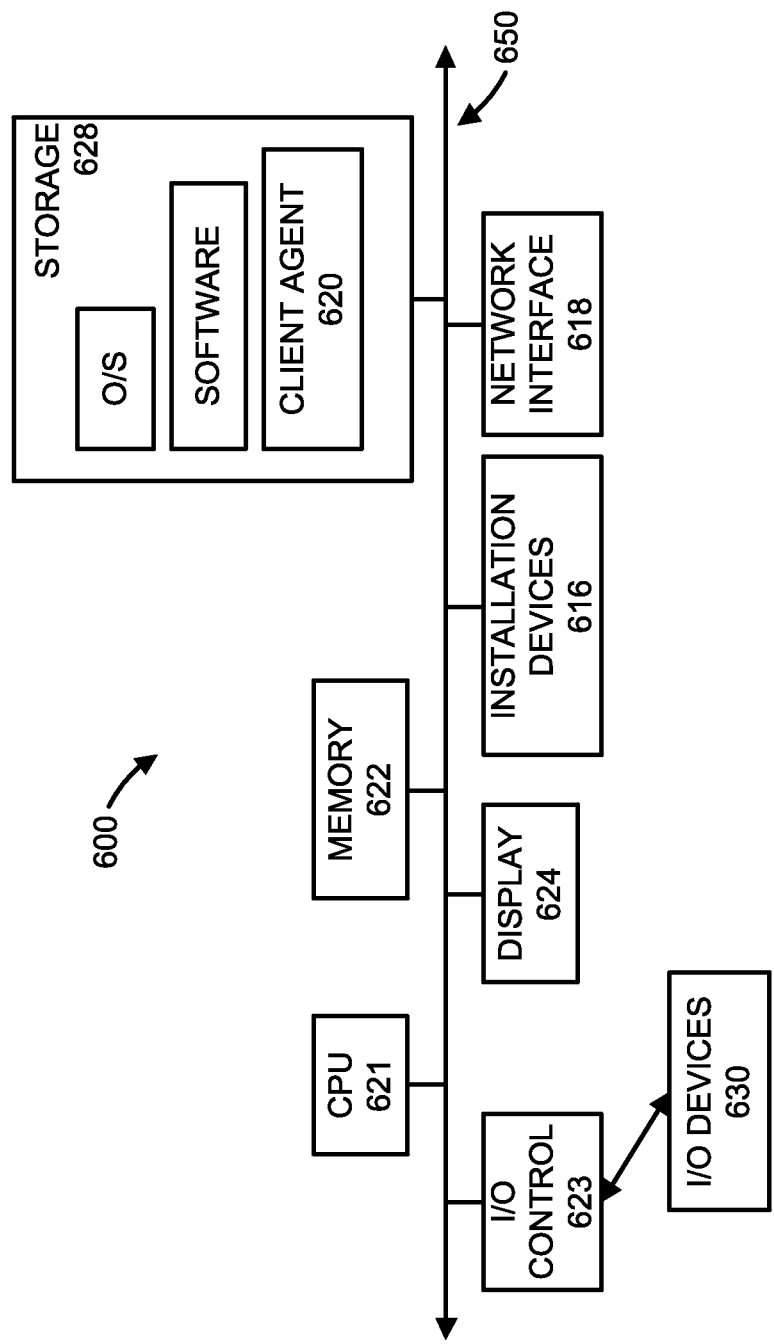
FIGS. 6A-6B are block diagrams of exemplary computing devices, consistent with embodiments of the present disclosure.
Figure 6B:
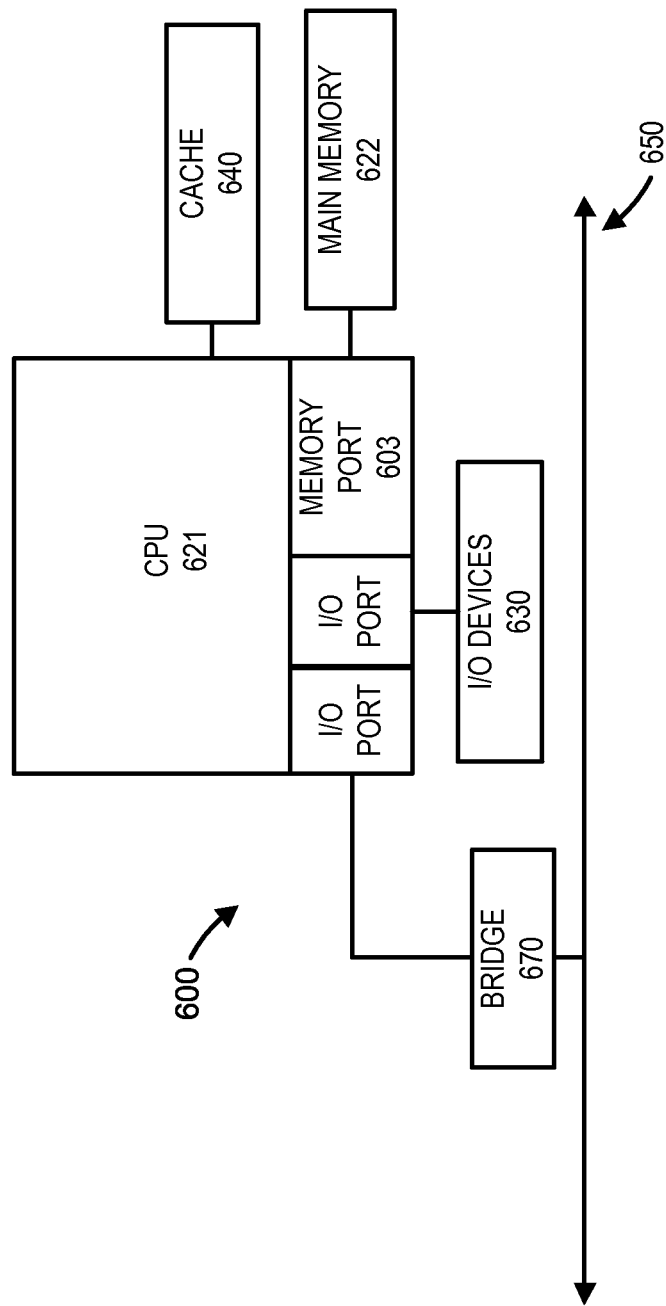

As shown in FIGS. 6A-6B, each computing device 600 (e.g., client device 102 or appliance 130) includes a central processing unit (CPU) 621 and a main memory 622. CPU 621 can be any logic circuitry that responds to and processes instructions fetched from the main memory 622. CPU 621 can be a single or multiple microprocessors, field-programmable gate arrays (FPGAs), or digital signal processors (DSPs) capable of executing particular sets of instructions stored in a memory (e.g., main memory 622) or cache (e.g., cache 640). The memory can include a tangible and/or nontransitory computer-readable medium, such as a flexible disk, a hard disk, a flash drive, a CD-ROM (compact disk read-only memory), MO (magneto-optical) drive, a DVD-ROM (digital versatile disk read-only memory), a DVD-RAM (digital versatile disk random-access memory), a solid state disk (SSD), flash memory, a RAM, a cache, a register, or a semiconductor memory. Main memory 622 can be one or more memory chips capable of storing data and allowing any storage location to be accessed by CPU 621. Main memory 622 can be any type of random access memory (RAM), or any other available memory chip capable of operating as described herein. In the exemplary embodiment shown in FIG. 6A, CPU 621 communicates with main memory 622 via system bus 650. Computing device 600 can also include visual display device 624 and input/output (I/O) device 630 (e.g., a keyboard, mouse, or pointing device) connected through I/O controller 623, both of which communicate via system bus 650. Furthermore, I/O device 630 can also provide storage and/or an installation medium for the computing device 600.

FIG. 6B depicts an embodiment of an exemplary computing device 600 in which CPU 621 communicates directly with main memory 622 via memory port 603. CPU 621 can communicate with cache 640 via a secondary bus, sometimes referred to as a backside bus. In some other embodiments, CPU 621 can communicate with cache 640 via system bus 650. Cache 640 typically has a faster response time than main memory 622. In some embodiments, CPU 621 can communicate directly with I/O device 630 via an I/O port. In further embodiments, I/O device 630 can be a bridge 670 between system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 6A, computing device 600 can support any suitable installation device 616, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 620, or portion thereof. Computing device 600 can further comprise storage device 628, such as one or more hard disk drives or redundant arrays of independent disks, for storing an operating system and other related software, and for storing application software programs such as any program related to client agent 620. Optionally, any of the installation devices 616 could also be used as storage device 628.

Furthermore, computing device 600 can include a network interface 618 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 618 can comprise a built-in network adapter, network interface card, PCMCIA network card, card bus network adapter, wireless network adapter, USB network adapter, modem or any other device suitable for interfacing computing device 600 to any type of network capable of communication and performing the operations described herein.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method comprising communicating, by a device responsive to receiving a first handshake message from a client device to a service, a second handshake message to the client device that identifies a first certificate for the device; receiving, by the device, a second certificate indicating a first function of a connection and a second function of the connection subsequent to the device being authorized by the client device to provide the connection; and determining, by the device based at least on the second function, an action associated with providing the service via the connection.

2. The method of claim 1, wherein the first function is to facilitate authentication of the client device with the service.

3. The method of claim 1, wherein the second function indicates a type of data included in a payload communicated via the connection.

4. The method of claim 1, wherein the action comprises identifying a destination of a payload communicated via the connection.

5. The method of claim 1, wherein the destination is determined based on a type of data identified by the second certificate.

6. The method of claim 1, wherein the device is intermediary to the client device and the service.

7. The method of claim 1, further comprising receiving, by the device, the second certificate from the client service.

8. A device comprising
one or more processors, coupled to memory and configured to:
communicate, responsive to receiving a first handshake message from a client device to a service, a second handshake message to the client device that identifies a first certificate for the device;
receive a second certificate indicating a first function of a connection and a second function of the connection subsequent to the device being authorized by the client device to provide the connection; and
determine, based at least on the second function, an action associated with providing the service via the connection.

9. The method of claim 8, wherein the first function is to facilitate authentication of the client device with the service.

10. The device of claim 8, wherein the second function indicates a type of data included in a payload communicated via the connection.

11. The device of claim 8, wherein the action comprises identifying a destination of a payload communicated via the connection.

12. The device of claim 8, wherein the destination is determined based on a type of data identified by the second certificate.

13. The device of claim 8, wherein the device is intermediary to the client device and the service.

14. The device of claim 8, wherein the one or more processors are further configured to receive the second certificate from the client device.

15. A system comprising:
a client of a plurality of clients in communication with a device intermediary to the plurality of clients and a service, the client configured to:
identify that a handshake message received by the client is not from the service the client intended to reach;
determine that the handshake message was received from the device, the device being on an approved list; and communicate to the device responsive to the device being identified as on the approved list a certificate indicating a first function of a connection and a second function of the connection, wherein the second function is used by the device to determine a destination to send data received via the connection from the client.

16. The system of claim 15, wherein the first function is to facilitate authentication of the client with the service.

17. The system of claim 15, wherein the second function indicates a type of data included in a payload communicated by the client via the device.

18. The system of claim 17, wherein the second function causes the device to determine the destination based on the type of data.

19. The system of claim 15, wherein the client is configured to determine that the device is a trusted device on the approved list.

20. The system of claim 15, wherein the approved list specifies certificate pinning.

* * * * *